United States Patent
Yeh et al.

(10) Patent No.: US 10,461,799 B2
(45) Date of Patent: Oct. 29, 2019

(54) INTEGRATED TRANSMITTER AND RECEIVER FRONT END MODULE, TRANSCEIVER, AND RELATED METHOD

(71) Applicant: TAIWAN SEMICONDUCTOR MANUFACTURING COMPANY, LTD., Hsinchu (TW)

(72) Inventors: En-Hsiang Yeh, Hsinchu (TW); Monsen Liu, Zhudong Township (TW); Chuei-Tang Wang, Taichung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 596 days.

(21) Appl. No.: 13/672,173

(22) Filed: Nov. 8, 2012

(65) Prior Publication Data
US 2014/0128009 A1    May 8, 2014

(51) Int. Cl.
| | | |
|---|---|---|
| H04B 1/40 | (2015.01) | |
| H04B 1/44 | (2006.01) | |
| H01L 23/28 | (2006.01) | |
| H01L 23/31 | (2006.01) | |
| H04B 1/48 | (2006.01) | |
| H04B 1/04 | (2006.01) | |
| H04B 1/18 | (2006.01) | |

(52) U.S. Cl.
CPC ............. *H04B 1/48* (2013.01); *H04B 1/0458* (2013.01); *H04B 1/18* (2013.01)

(58) Field of Classification Search
CPC .......... H04B 1/0458; H04B 1/18; H04B 1/48; H04B 1/44; H04B 1/40; H01L 23/525; H01L 23/538; H01L 23/28; H01L 25/065; H01L 23/31; H01L 25/18
See application file for complete search history.

(56) References Cited

U.S. PATENT DOCUMENTS

| | | | |
|---|---|---|---|
| 6,229,227 B1 * | 5/2001 | Muthukumaraswamy | ................. H01L 23/525 257/E23.146 |
| 6,472,747 B2 * | 10/2002 | Bazarjani | ............ H01L 23/3128 257/724 |
| 7,283,793 B1 | 10/2007 | McKay | |
| 7,817,966 B2 * | 10/2010 | Prikhodko | ................ H01P 1/15 455/277.1 |
| 8,405,467 B2 * | 3/2013 | He | ............................ H03H 7/40 333/17.3 |
| 8,432,237 B2 * | 4/2013 | Klemens | ................... H03F 1/56 333/126 |
| 8,923,168 B2 * | 12/2014 | Mikhemar | ............... H04B 1/18 370/276 |
| 8,923,783 B2 * | 12/2014 | Ashizuka | ............. H04B 1/0458 333/126 |
| 8,989,678 B2 * | 3/2015 | Nicolson | .................. H04B 1/48 455/78 |
| 2007/0232241 A1 * | 10/2007 | Carley | ..................... H04B 1/44 455/83 |

* cited by examiner

*Primary Examiner* — Pablo N Tran
(74) *Attorney, Agent, or Firm* — Hauptman Ham, LLP

(57) ABSTRACT

A front end module includes a transmitter path network coupled to an antenna and a transmitter, and includes a first selectable matching network. The front end module further includes a receiver path network coupled to the antenna and a receiver. The receiver path network is a second selectable matching network.

20 Claims, 8 Drawing Sheets

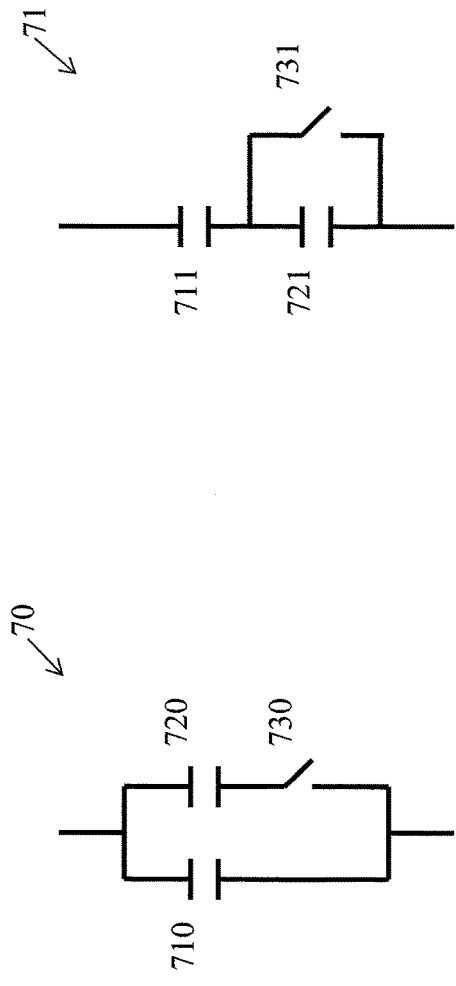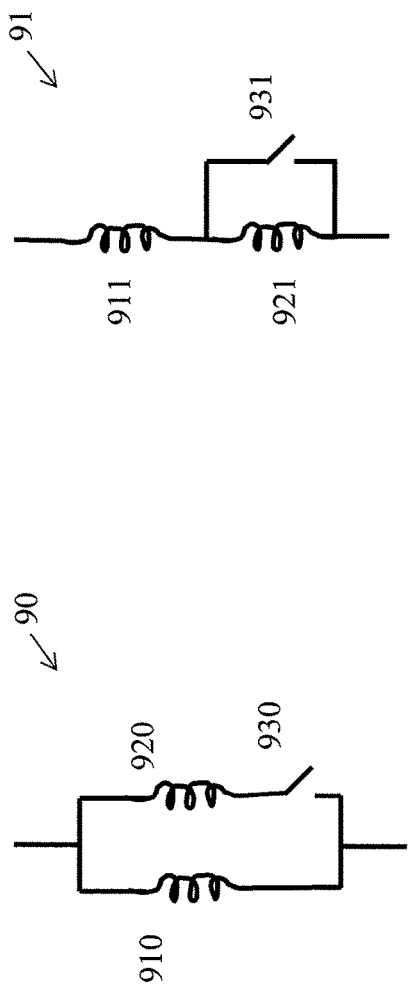
Figure 7
Figure 8
Figure 9
Figure 10

INTEGRATED TRANSMITTER AND RECEIVER FRONT END MODULE, TRANSCEIVER, AND RELATED METHOD

BACKGROUND

Radio frequency (RF) communication enables transmission and reception of voice and data between communication devices without an intermediate wire connecting the devices. To perform RF communication, the communication device will typically send and receive radio frequency signals using a wireless transmitter and a wireless receiver. In an RF transceiver, a front-end module (FEM) is an electronic circuit block that runs between an antenna and an RF chip.

BRIEF DESCRIPTION OF THE DRAWINGS

For a more complete understanding of the present embodiments, and the advantages thereof, reference is now made to the following descriptions taken in conjunction with the accompanying drawings, in which:

FIGS. 7-10 are circuit diagrams of variable impedance networks in accordance with various embodiments of the present disclosure.

DETAILED DESCRIPTION OF ILLUSTRATIVE EMBODIMENTS

Figure 1:
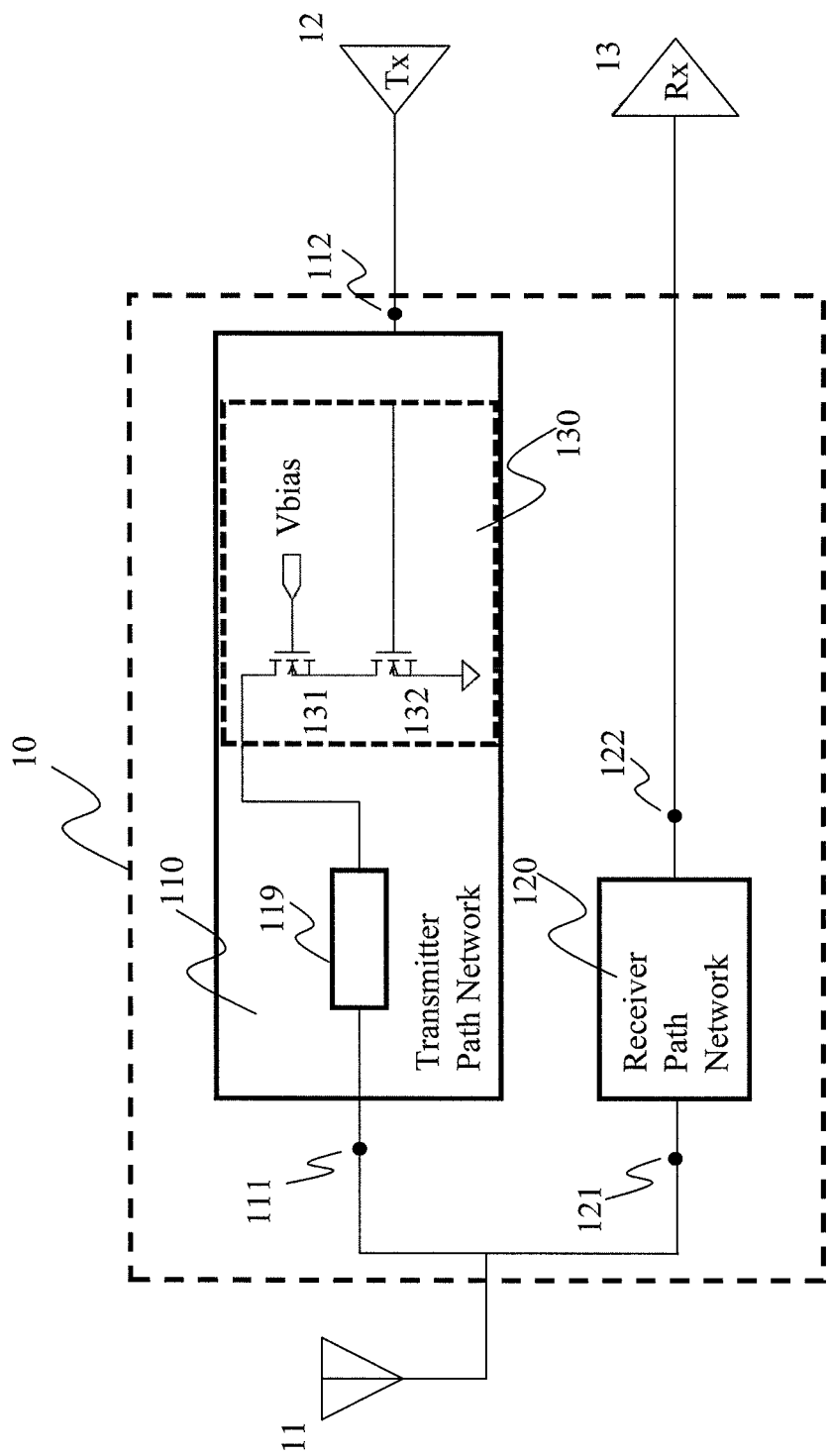
FIG. 1 is a circuit diagram of a front-end module (FEM) in accordance with various embodiments of the present disclosure.

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Some embodiments will be described with respect to a specific context, namely a small form factor, low cost radio frequency (RF) front end module (FEM), and the like. Some embodiments may also be applied to other types of RF circuits.

Throughout the various figures and discussion, like reference numbers refer to like components. Also, although singular components may be depicted throughout some of the figures, this is for simplicity of illustration and ease of discussion. A person having ordinary skill in the art will readily appreciate that such discussion and depiction can be and usually is applicable for many components within a structure.

Some circuits are powered and/or biased by multiple voltages. The multiple voltages set up potential differences that allow electrical currents to flow throughout the circuit to perform various functions. Some electrical currents are defined as flowing from high voltage to low voltage. Some voltage sources in circuits are defined in terms of a supply voltage and ground, with ground representing 0 Volts. Other definitions are sometimes given in terms of an upper supply voltage (VDD, VCC), and a lower supply voltage (VSS, VEE). Thus, in some embodiments, a circuit that operates on a 1.8 Volt supply is defined as having an upper bias of 0.9 Volts, and a lower bias of −0.9 Volts. In the following description, the term "ground" should be interpreted as including low supply voltage, such as the −0.9 Volts for example. Specific voltages discussed below are not then intended so much to limit the scope of the disclosure, and one of ordinary skill in the art will recognize various voltages are applicable to the current disclosure.

RF FEMs provide an interface between a wireless antenna and an RF chip. Some RF FEM known to the inventor include a bulky circuit block using a large amount of discrete components. RF switches in the RF FEM have high breakdown voltage. Thus, discrete components, which have traditionally offered higher breakdown voltage performance than integrated devices, are chosen as the RF switches to improve device reliability. As a result, complementary metal-oxide-semiconductor (CMOS) devices, which do not have sufficiently high breakdown voltages, have not replaced discrete RF switches. The result is a lack of integrability of the FEM. Instead, discrete chips, such as expensive GaAs switches have been necessary for the FEM. In addition, the FEM architecture network is complex, which means that a large number of discrete inductors and capacitors are also required within the FEM. This makes the some FEM large and bulky.

In the following disclosure, a novel FEM architecture that is highly integrable is introduced. Through intelligent use of resonance networks, a receiver path in the FEM is switched to high impedance during transmission, and a transmitter path in the FEM is switched to high impedance during reception. RF switches, which accomplish the switching of the resonance networks, are operated at low voltage nodes, which relaxes a breakdown voltage requirement on the RF switches. As a result, integrated metal-oxide-semiconductor field effect transistors (MOSFETs) can be used as the RF switches, to replace discrete RF switches. Although not limited to wafer level packages, when used in a wafer level package configuration, post passivation interconnect (PPI) inductors and on-chip capacitors can be combined with the MOSFET switches, so that the FEM and wireless chip can be integrated into a wafer level package with small size in comparison with some other FEMs. As an additional benefit, use of high-Q PPI inductors can help minimize RF power insertion loss of the FEM.

A circuit diagram of a front-end module (FEM) 10 in accordance with various embodiments of the present disclosure is shown in FIG. 1. The FEM 10 is electrically connected to an antenna 11, and at least one of a transmitter 12 and a receiver 13. In some embodiments, the antenna 11 is an omnidirectional antenna, planar inverted F antenna (PIFA), folded inverted conformal antenna (FICA), a patch antenna, a smart antenna, or the like. The transmitter 12 is a radio frequency transmitter, and may include digital and/or analog circuits, such as modulators, interpolators, digitalto-analog converters (DACs), filters, phase-locked loops, oscillators, buffers, and the like. The receiver 13 is a radio frequency receiver, and may include digital and/or analog circuits, such as low noise amplifiers, mixers, oscillators, filters, analog-to-digital converters (ADCs), phase-locked loops, delay-locked loops, and the like. In some embodiments, the receiver 13 operates at a frequency other than radio frequency. In some embodiments, the receive 13 operations at a frequency ranging from a low frequency, e.g., 3 kiloHertz (kHz) to a microwave frequency, e.g., 300 gigaHertz (GHz). The FEM 10 includes a transmitter path network 110 between the transmitter 12 and the antenna 11. A power amplifier 130 amplifies transmission signals generated by the transmitter 12. The power amplifier 130 includes two MOSFETs 131 and 132. In some embodiments, different power amplifier architectures are used for the power amplifier 130. The MOSFET 131 is biased by a bias voltage Vbias, and a gate of the MOSFET 132 receives transmission signals from the transmitter 12. In some embodiments, the power amplifier 130 is considered part of the transmitter path network 110. The FEM 10 also provides a receiver path network 120 between the antenna 11 and the receiver 13.

The transmitter path network 110 includes a first variable impedance network 119, which may generally include switches, inductors, and/or capacitors. Impedance of the transmitter path network 110 is electrically selectable, and in some embodiments is selected by inputting a first voltage, or set of voltages, to the transmitter path network 110. During transmission, the FEM 10 operates in a transmit mode, the first variable impedance network 119 has low or no impedance to allow RF signal(s) to travel from node 112 to node 111. For example, the first variable impedance network 119 is switched to a low or zero impedance configuration around the time transmission begins. During receiving, the FEM 10 operates in a receive mode, the first variable impedance network 119 has high impedance at node 111 corresponding to the antenna 11, which blocks signals from the antenna 11 and/or the receiver 13 from reaching the power amplifier 130 and the transmitter 12. The first variable impedance network 119 having high impedance also blocks signals from the transmitter 12 from reaching the antenna 11 and/or the receiver 13 by presenting high impedance to the node 112. The transmitter path network 110 is switched to the high impedance configuration around the time receiving begins. It should be appreciated that "allowing" and "blocking" may be relative terms, where "allowing" indicates passing, amplifying, or only slightly attenuating a signal, and "blocking" indicates heavily attenuating or even decoupling a signal.

The receiver path network 120 is a second variable impedance network, which may generally include switches, inductors, and/or capacitors. In some embodiments, impedance of the receiver path network 120 is electrically selectable through switching control, and is selected by inputting a second voltage, or set of voltages, to the receiver path network 120. In some embodiments, the switches are single-transistor switches, pass gates, combinations thereof, or the like. During receiving, the FEM 10 operates in the receive mode, the receiver path network 120 has low to no impedance, allowing RF signal(s) to travel from node 121 to node 122, e.g. from the antenna 11 to the receiver 13. For example, the receiver path network 120 is switched to a low or zero impedance configuration around the time receiving begins. During transmitting, the FEM 10 operates in the transmit mode, the receiver path network 120 has high impedance at node 121, which blocks signals from the antenna 11 and/or the transmitter 12 from reaching the receiver 13. For example, the receiver path network 120 is switched to a high impedance configuration around the time transmitting begins. It should be appreciated that "allowing" and "blocking" may be relative terms, where "allowing" indicates passing, amplifying, or only slightly attenuating a signal, and "blocking" indicates heavily attenuating or even decoupling a signal.

Figure 2:
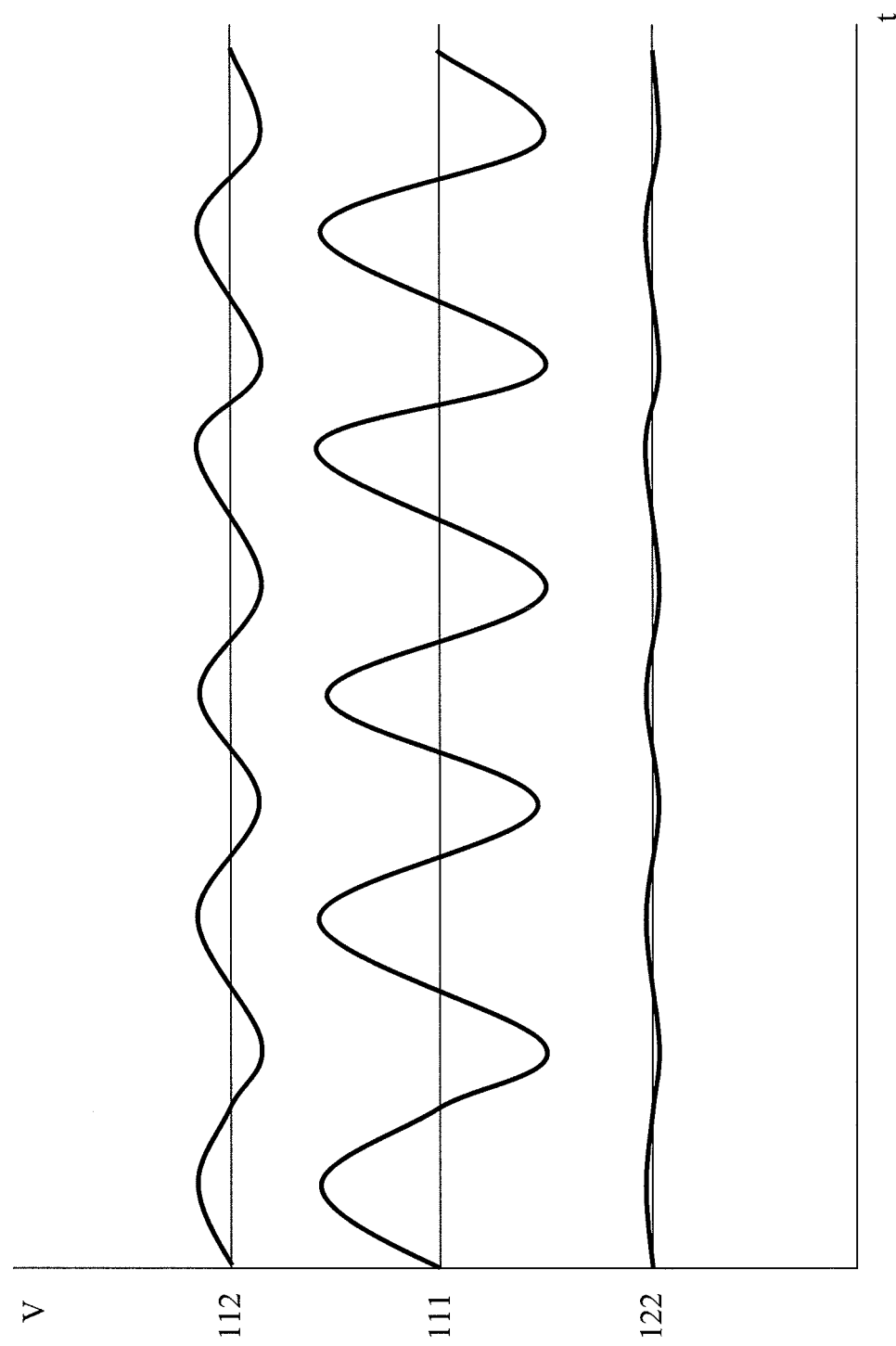
FIG. 2 is a graph of exemplary waveforms of voltages at nodes during transmission in accordance with various embodiments of the present disclosure.

Exemplary waveforms of voltages at nodes 111, 112, 122 during transmission in accordance with various embodiments of the present disclosure are shown in FIG. 2. For purposes of illustration, node 121 and node 111 are considered as a single node, which corresponds to the antenna 11. In transmit mode, the transmitter 12 transmits a signal to the power amplifier 130, which in turn amplifies the signal to generate the waveform at node 112 shown in FIG. 2. Because the FEM 10 operates in transmit mode, the transmitter path network 110 has low or zero impedance, and the waveform at node 112 is allowed to pass to node 111 and be transmitted out by the antenna 11. The receiver path network 120 has high impedance, such that the waveform at node 111 is blocked by the receiver path network 120, leading to the waveform for node 122 shown in FIG. 2, which is either completely attenuated or heavily attenuated relative to the waveform at node 111.

Figure 3:
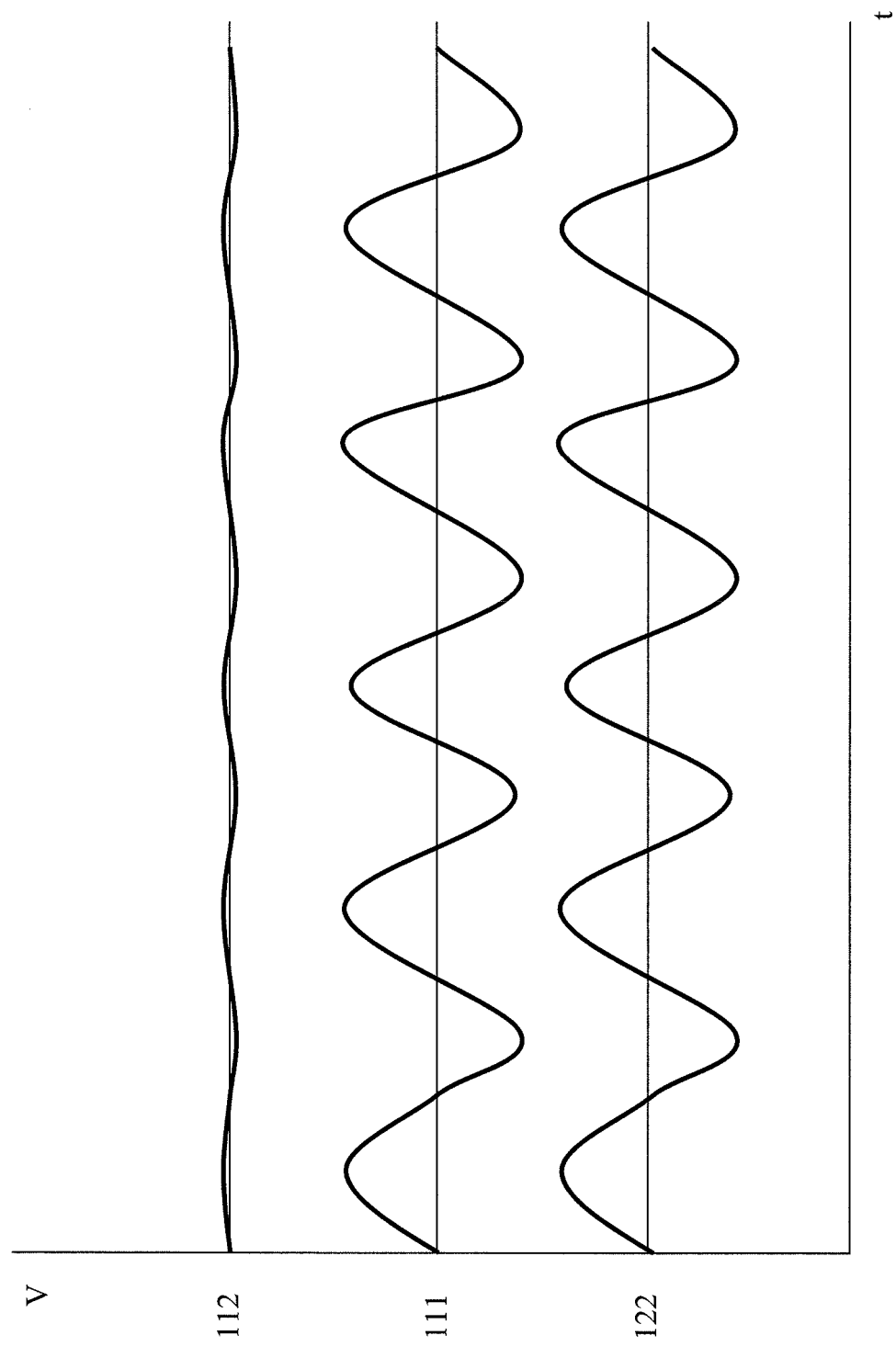
FIG. 3 is a graph of exemplary waveforms of voltages at nodes during receiving in accordance with various embodiments of the present disclosure.

Exemplary waveforms of voltages at nodes 111, 112, 122 during receiving in accordance with various embodiments of the present disclosure are shown in FIG. 3. For purposes of illustration, node 121 and node 111 are considered as a single node, which corresponds to the antenna 11. In the receive mode, the antenna 11 receives an RF signal such as the waveform shown for node 111. Because the FEM 10 operates in receive mode, the receiver path network 120 has low or zero impedance, and the waveform at node 111 is allowed to pass to node 122 and be received and processed by the receiver 13. The transmitter path network 110 has high impedance, such that the waveform at node 111 is blocked from entering the power amplifier 130 and the transmitter 12 by the transmitter path network 110, leading to the waveform for node 112 shown in FIG. 3, which is either completely attenuated or heavily attenuated relative to the waveform at node 111.

Figure 4:
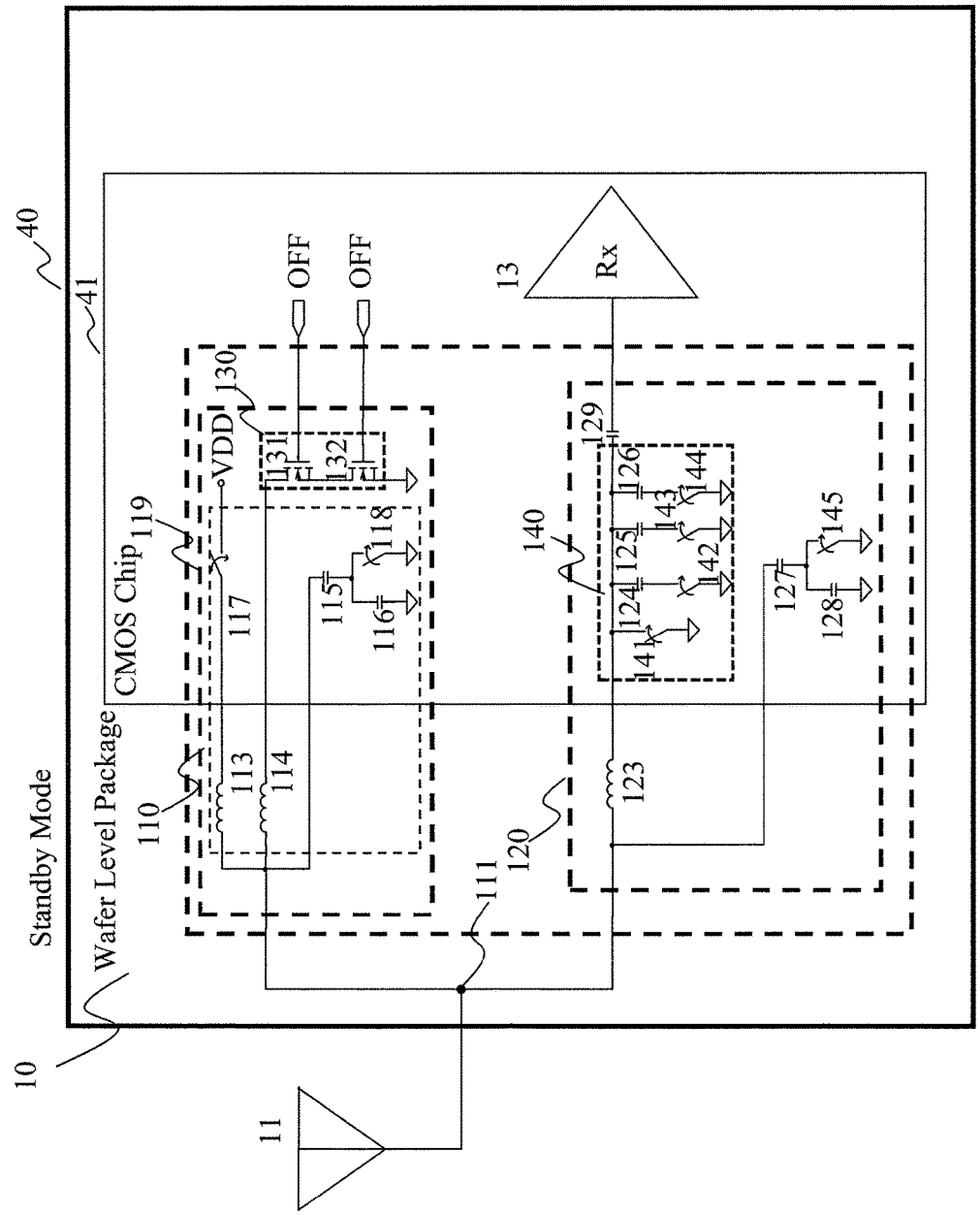
FIG. 4 is a circuit diagram of a FEM in accordance with various embodiments of the present disclosure.

A detailed circuit diagram of the FEM 10 in accordance with various embodiments of the present disclosure is shown in FIG. 4. The FEM 10 as shown in FIG. 4 is in a standby mode, which may indicate that no transmission or receiving occurs. In some embodiments, the FEM 10 is formed in a wafer level package 40, where part of the FEM 10 is formed in a complementary metal-oxide-semiconductor (CMOS) chip 41 of the wafer level package 40, and a remaining part of the FEM 10 is formed outside the CMOS chip 41. In some other embodiments, the entire FEM 10 is formed within the CMOS chip 41. For illustrative purposes, the FEM 10 shown in FIG. 4 is shown having parts both inside and outside the CMOS chip 41 of the wafer level package 40. It should also be appreciated that other types of packaging that include PPI inductors are within the scope of this disclosure.

The transmitter path network 110 includes inductors 113, 114, capacitors 115, 116, and switches 117, 118. In some embodiments, the inductors 113 and 114 are included in a package-side part of the transmitter path network 110, and the capacitors 115 and 116 and the switches 117 and 118 are included in a die-side part of the transmitter path network 110. The power amplifier 130 is also included in the die-side part of the transmitter path network 110 in some embodiments. The die-side part of the transmitter path network 110 is electrically connected to the transmitter 12, and the package-side part of the transmitter path network 110 is electrically connected to both the die-side part of the transmitter path network 110 and the antenna 11. It is appreciated that values (sizes, voltage tolerances, quality factors, and the like) of the various components 113-118 can be chosen in view of demands on performance parameters, such as operating frequency, channel selectivity, amplification, attenuation, and the like. In some embodiments, the inductors 113, 114 are PPI inductors, integrated inductors, discrete inductors, or the like. The inductor 113 has a first terminal electrically connected to the antenna 11, e.g. at the node 111. The inductor 113 has a second terminal electrically connected to a first terminal of the switch 117. A second terminal of the switch 117 is electrically connected to a voltage supply for receiving a supply voltage VDD. The inductor 113 and the switch 117 form a first branch of the transmitter path network 110. In the standby mode, the switch 117 is open (turned off), making the second branch a high impedance or open-circuit (infinite impedance) branch. If the switch 117 is a pass gate, for example, an N-type metal-oxide-semiconductor (NMOS) transistor, the NMOS transistor is turned off by applying a low voltage to a gate thereof. If the pass gate is a P-type metal-oxide-semiconductor (PMOS) transistor, the PMOS transistor is turned off by applying a high voltage to a gate thereof.

The inductor 114 has a first terminal electrically connected to the node 111, and a second terminal electrically connected to a drain terminal of the MOSFET 131 of the power amplifier 130. The inductor 114 has a path to ground through channels of the MOSFETs 131 and 132. The inductor 114 and the MOSFETs 131 and 132 form a second branch of the transmitter path network 110. In the standby mode, the MOSFETs 131 and 132 are both turned off, e.g. by applying a low voltage to the gates thereof, making the second branch a high impedance or open-circuit (infinite impedance) branch.

A third branch of the transmitter path network 110 includes the capacitor 115, the capacitor 116, and the switch 118. In some embodiments, the capacitor 115 is a MOSFET capacitor, a metal-insulator-metal (MIM) capacitor, a metal-oxide-metal (MOM) capacitor, a poly-poly capacitor, another vertical-type capacitor, a lateral-type capacitor, or the like. A first terminal of the capacitor 115 is electrically connected to the node 111, and a second terminal of the capacitor 115 is electrically connected to the capacitor 116 and the switch 118. A first terminal of the capacitor 116 is electrically connected to the second terminal of the capacitor 115, and a second terminal of the capacitor 116 is grounded. The switch 118 runs in parallel to the capacitor 116, having a first terminal electrically connected to the second terminal of the capacitor 115, and a second terminal that is grounded. Capacitance of the third branch can be selected using the switch 118. In the standby mode, the switch 118 is open (turned off), so that capacitance of the third branch is equal to the serial capacitance of the capacitor 115 and the capacitor 116, which is lower than the capacitance of the capacitor 115 alone.

In the standby mode, the MOSFETs 131 and 132 of the power amplifier are both off (open), and the switches 117, 118 are also off (open), such that impedance of the transmitter path network 110 is determined solely by the serially-connected capacitors 115 and 116, e.g. C1*C2/(C1+C2), where C1 is a capacitance of the capacitor 115, and C2 is a capacitance of the capacitor 116.

The receiver path network 120 includes an inductor 123, capacitors 124-129, and switches 141-145. In some embodiments, the components 123-129, 141-145 are integrated, discrete, or a combination thereof. In some embodiments, the inductor 123 is included in a package-side part of the receiver path network 120, and the capacitors 124-129 and the switches 141-145 are included in a die-side part of the receiver path network 120. The die-side part of the receiver path network 120 is electrically connected to the receiver 13, and the package-side part of the receiver path network 120 is electrically connected to both the die-side part of the receiver path network 120 and the antenna 11. Through proper control of the switches 141-145, the receiver path network 120 may act as either an LC resonator or as a pi matching network. In detail, a first terminal of the inductor 123 is electrically connected to the node 111, and a second terminal of the inductor 123 is electrically connected to a first terminal of the capacitor 129. In some embodiments, the inductor 123 is a PPI inductor formed in the wafer level package 40. The capacitor 129 has a second terminal electrically connected to an input terminal of the receiver 13.

The capacitors 124-126 and the switches 141-144 form a tunable capacitance unit 140 having capacitance that is tuned in some embodiments by selective opening/closing of the switches 141-144. First terminals of the capacitors 124-126 and the switch 141 are electrically connected to the second terminal of the inductor 123 and the first terminal of the capacitor 129. A second terminal of the capacitor 124 is electrically connectable to ground through the switch 142. A second terminal of the capacitor 125 is electrically connectable to ground through the switch 143. A second terminal of the capacitor 126 is electrically connectable to ground through the switch 144. A second terminal of the switch 141 is electrically connected to ground. Closing any of the switches 142-144 increases capacitance of the tunable capacitance unit, and opening any of the switches 142-144 decreases the capacitance of the tunable capacitance unit. In some embodiments, the capacitors 124, 125, 126 are of the same capacitance, different capacitances, or a combination thereof. Closing the switch 141 zeroes the capacitance of the tunable capacitance unit 140 by creating a direct path to ground that shunts out the capacitors 124, 125, 126. Thus, the tunable capacitance unit 140 can have capacitance ranging from substantially zero Farads to a finite value of Farads, e.g. on the order of picofarads. In some embodiments, the tunable capacitance unit 140 has a capacitance ranging from $10^{-15}$ farads to $10^{-6}$ farads. In the standby mode, the switches 141-144 are off (open-circuited), such that the tunable capacitance unit 140 is open-circuited, and presents zero capacitance at a node between the inductor 123 and the capacitor 129. The inductor 123, the tunable capacitance unit 140, and the capacitor 129 form a first branch of the receiver path network 120.

The capacitors 127, 128 and the switch 145 form a second branch of the receiver path network 120. Capacitance of the second branch of the receiver path network 120 is selectable through operation of the switch 145. The capacitor 127 has a first terminal electrically connected to the node 111, and a second terminal electrically connected to the capacitor 128 and the switch 145. First terminals of the capacitor 128 and the switch 145 are electrically connected to the second terminal of the capacitor 127. Second terminals of the capacitor 128 and the switch 145 are grounded. The switch 145 being turned on (short-circuited) lowers the capacitance of the second branch, and the switch 145 being turned off (open-circuited) raises the capacitance of the second branch. In the standby mode, the switch 145 is turned off (open), and the capacitance of the second branch is equal to C3*C4/(C3+C4), where C3 represents a capacitance of the capacitor 127, and C4 represents a capacitance of the capacitor 128.

The capacitance of the second branch is lower in the standby mode than the capacitance of the capacitor 127 alone.

Embodiments in which the transmitter path network 110 is formed fully within the CMOS chip 41 and the receiver path network 120 is formed both inside and outside the CMOS chip 41 are contemplated herein. Embodiments in which the receiver path network 120 is formed fully within the CMOS chip 41 and the transmitter path network 110 is formed both inside and outside the CMOS chip 41 are also contemplated herein. Embodiments in which the transmitter path network 110 and the receiver path network 120 are both formed inside the CMOS chip 41 are also contemplated herein.

As mentioned above, non-integrated designs may include discrete, high breakdown voltage components, such as GaAs switches, and discrete capacitors and inductors. In some embodiments, the FEM 10 does not use discrete components, and is highly integrable. Embodiments that use the non-integrated designs for the transmitter path, and the highly integrable design for the receiver path described herein are contemplated. Embodiments that use the non-integrated designs for the receiver path, and the highly integrable design for the transmitter path described herein are also contemplated.

Figure 5:
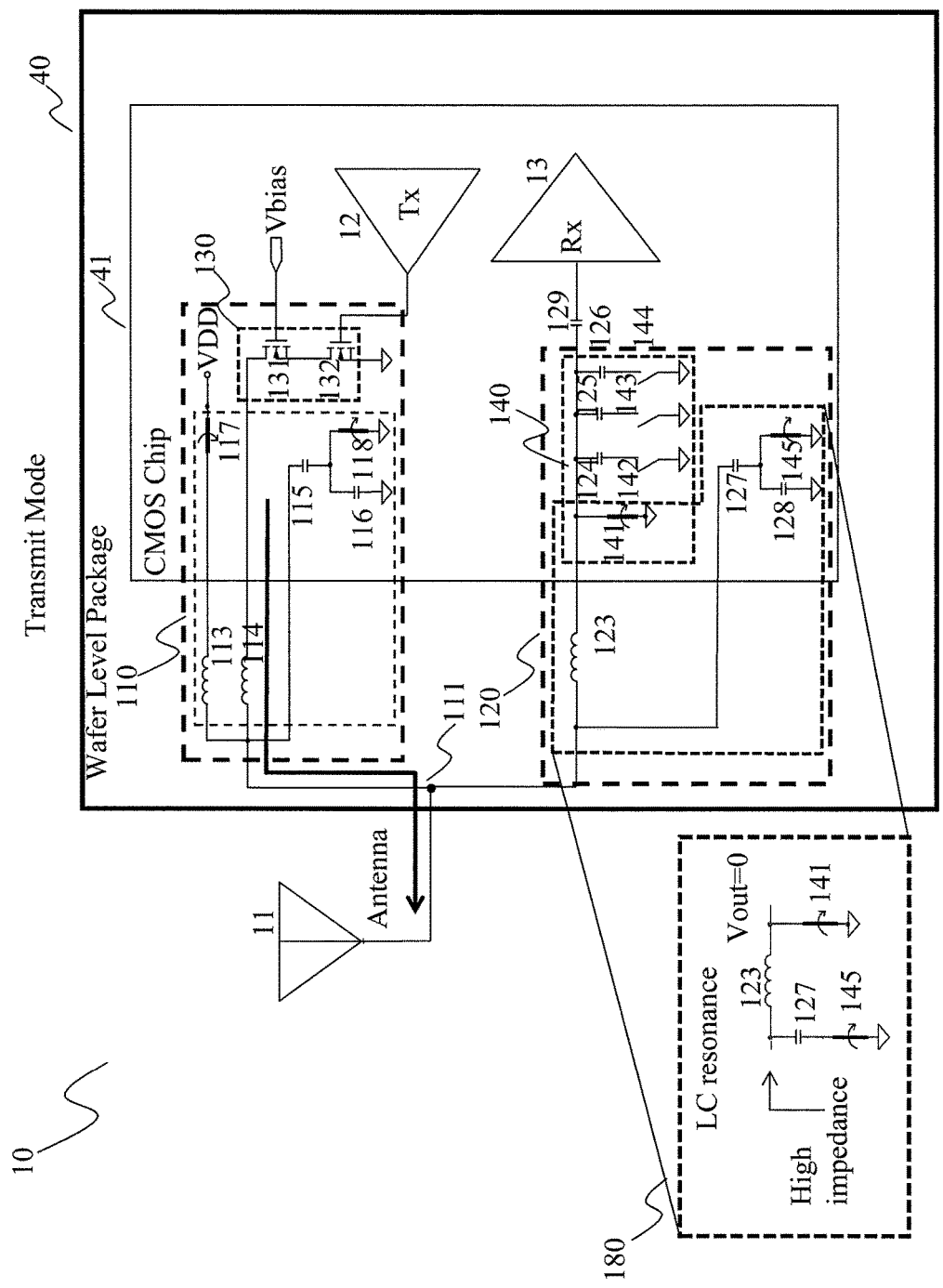
FIG. 5 is a circuit diagram of the FEM of FIG. 4 during a transmit mode in accordance with various embodiments of the present disclosure.

In FIG. 5, ground terminals of the capacitors 116, 128, the switches 118, 141-145, and the MOSFET 132 are electrically connected to ground, a lower supply voltage, or the like. The ground terminals are biased by the same voltage, e.g. ground, different voltages, or a combination thereof, for the sake of circuit performance.

Around the beginning of the transmit mode, the switches 117, 118, and 141-145, and the MOSFETs 131, 132 are biased in such as a way as to allow transmission of signals from the transmitter 12 to the antenna 11 through the power amplifier 130 and the transmitter path network 110, while blocking the transmission signals from the node 111 to the receiver 13 through the receiver path network 120. One such biasing configuration is shown in FIG. 5, in which the switches 117, 118, 141, and 145 are closed (turned on) in the transmit mode, the MOSFET 131 is biased by a bias voltage Vbias, and the gate of the MOSFET 132 receives transmission signals to be outputted through the antenna from the transmitter 12. In the transmitter path network 110, closing switch 117 provides a current path from the node 111 to the supply voltage VDD through the inductor 113, and closing the switch 118 shorts out the capacitor 116, increasing the capacitance of the third branch of the transmitter path network 110. As such, the inductors 113, 114 and the capacitor 115 form a matching network between the antenna 11 and the power amplifier 130. The transmitter path network 110 shown in FIG. 5 is only one type of matching network available for use in the FEM 10. Embodiments including a pi network, a T network, an L network, or combinations thereof in the transmitter path network 110 are also contemplated herein.

On the receiver side, during the transmission operation cycle, the receiver path network 120 is configured as a high-impedance LC resonance that blocks signals from entering the receiver 13 from the antenna 11. In the configuration shown, the switches 141 and 145 are closed (turned on), while the switches 142-144 are opened (turned off). As such, capacitance of the tunable capacitance unit 140 is zero due to the direct path to ground through the switch 141. Capacitance of the second branch of the receiver path network 120 is increased due to the shorting out of the capacitor 128, leaving only the capacitance of the capacitor 127 in the second branch. As shown in FIG. 5, an equivalent circuit 180 of the receiver path network 120 includes the capacitor 127 and the inductor 123, which form an LC resonance that presents a high impedance at the node 111. The LC resonance shown in FIG. 5 is an L-type resonance circuit. Embodiments including a pi network, a T network, an L network, or combinations thereof in the receiver path network 120 are also contemplated herein.

Figure 6:
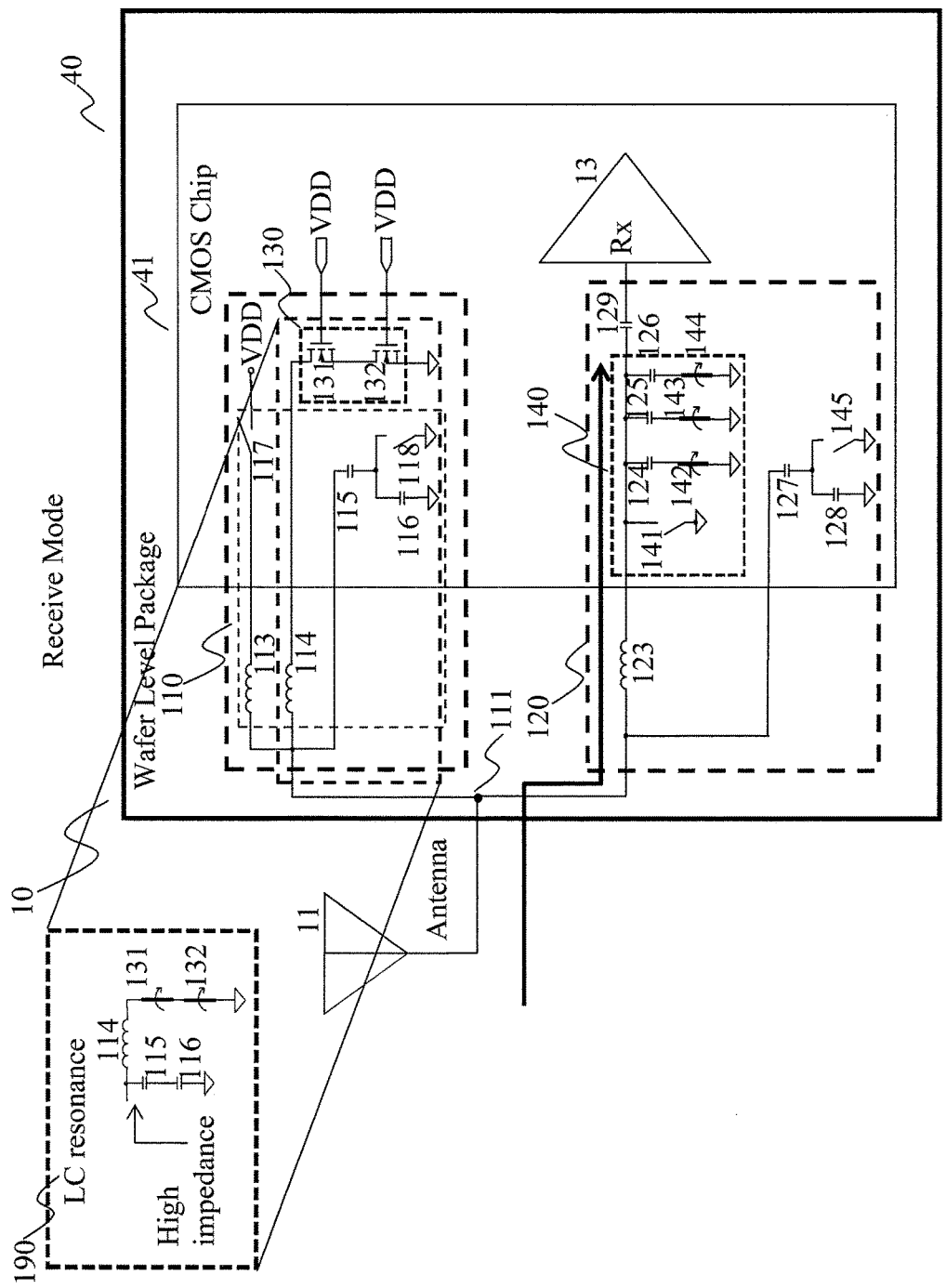
FIG. 6 is a circuit diagram of the FEM of FIG. 4 during a receive mode in accordance with various embodiments of the present disclosure.

Biasing conditions of the switches 117, 118, and 141-145, and the MOSFETs 131, 132 around the beginning of a receive mode in accordance with various embodiments of the present disclosure are shown in FIG. 6. Biasing is performed in such as a way as to allow receiving of incoming signals from the antenna 11 to the receiver 13 through the receiver path network 120, while blocking transmission of the incoming signals from the node 111 to the transmitter 12 through the transmitter path network 110. In the biasing configuration shown in FIG. 6, the switches 117, 118, 141, and 145 are opened (turned off), the MOSFETs 131 and 132 are biased by a supply voltage VDD, switches 142-144 are closed (turned on). In the receive mode, the receiver path network 120 is switched to form a pi matching network including the inductor 123, and left and right capacitive branches. The left capacitive branch runs from the left electrode of the inductor 123 to ground, and has capacitance set by the capacitors 127 and 128. The right capacitive branch runs from the right electrode of the inductor 123 to ground, and has capacitance set by the capacitors 124-126. The switch 145 being open reduces capacitance of the left capacitive branch by introducing the capacitor 128 in series with the capacitor 127 (series capacitors have lower combined capacitance than either capacitor in the series alone). The switch 141 being open removes the short to ground initially present in the transmit mode, and introduces a tuned capacitance set by the switchable capacitors 124-126 (switched by the switches 142-144). The capacitance of the right capacitive branch shown in FIG. 6 is the sum of capacitances of the capacitors 124-126 (capacitance of capacitors in parallel is the sum of the individual capacitances of the capacitors). The tunable capacitance unit 140 being tunable means that proper opening and closing of the switches 142-144 can modify overall capacitance of the tunable capacitance unit 140. In some embodiments, the capacitor 124 has capacitance C, the capacitor 125 has capacitance 2C (twice the capacitance of the capacitor 124), and the capacitor 126 has capacitance 4C (four times the capacitance of the capacitor 124). The use of the switches 141-144 allows for selection of capacitance of the tunable capacitance unit 140 equal to 0-7C in steps of 1C. Embodiments in which the capacitors 124-126 are replaced by a single capacitor, two capacitors, or more than three capacitors are contemplated herein. Configuring the receiver path network 120 as shown in FIG. 6 sets up impedance matching between the receiver 13 and the antenna 11, and allows incoming signals to reach the receiver 13 for further processing.

In the receive mode, the transmitter path network 110 is switched to provide high impedance through an LC resonance configuration. As shown in FIG. 6, the switches 117 and 118 are opened (turned off), while the MOSFETs 131 and 132 are closed (turned on). In this configuration, the MOSFETs 131 and 132 act as switches that set up a path to ground through the inductor 114. With the switch 117 turned off, the inductor 113 is open-circuited, and presents infinite impedance to the node 111. The switch 118 being open decreases capacitance of the branch including the capacitors 115 and 116 relative to the capacitance thereof in the transmit mode. Thus, from the node 111 looking toward the transmitter 12 (not shown in FIG. 6), the impedance of the transmitter path network 110 is high, as shown by an equivalent circuit 190 of the transmitter path network 110. Looking into the equivalent circuit 190, the antenna 11 sees the series capacitance of the capacitors 115 and 116, and the inductance of the inductor 114, which is a high AC impedance at the receiving frequency of the incoming signals.

The FEM 10 illustrated in FIGS. 4-6 utilizes the transmitter and receiver path networks 110, 120 that can be individually switched into at least two modes. In a first mode, the respective path network operates as a matching network, allowing RF signals to pass through, and matching impedances of the antenna and the respective processing block (transmitter 12 or receiver 13). In a second mode, the respective path network operates as a resonant circuit, using high AC impedance at the RF frequency to block signals (incoming signals blocked from the transmitter 12, or outgoing signals blocked from the receiver 13). Switching the respective path network involves shifting poles and/or zeros of the path network to an advantageous location on the frequency spectrum to block RF signals, or setting up matching impedance at the RF frequency of the incoming/outgoing signals. In some embodiments, the matching networks include pi matching networks, T matching networks, L matching networks, and combinations thereof. The matching networks may include one stage, as shown in FIGS. 4-6, or multiple stages to achieve greater channel selectivity.

Changing any capacitive or inductive component within the matching network will affect the pole(s) and zero(es) of the matching network. FIGS. 7-10 are circuit diagrams of switchable capacitive and inductive units 70, 71, 90 and 91 in accordance with various embodiments of the present disclosure. The capacitive unit 70 of FIG. 7 includes capacitors 710 and 720 and switch 730. Capacitance of the capacitive unit 70 is higher when the switch 730 is closed (turned on), and lower when the switch 730 is open (turned off). Closing the switch 730 sets up the parallel connection of the capacitors 710 and 720, which has a greater capacitance than the capacitance of the capacitor 710 alone. The capacitive unit 71 of FIG. 8 includes capacitors 711 and 721 and a switch 731. The capacitive unit 71 uses the switch 731 to selectively short out the capacitor 721. Thus, when the switch 731 is closed (turned on), the capacitive unit 71 has higher capacitance than when the switch 731 is open (turned off). Opening the switch 731 sets up the series connection of the capacitors 711 and 721, which has a lower capacitance than the capacitance of the capacitor 711 alone.

The inductive unit 90 of FIG. 9 includes a first inductor 910 and a switchable second inductor 920, which is switched by a switch 930. Closing the switch 930 introduces parallel inductance from the switchable second inductor 920, which lowers overall inductance of the inductive unit 90. Opening the switch 930 removes the switchable second inductor 920 by forming an open circuit, which increases the inductance of the inductive unit 90 to the inductance of the first inductor 910 alone. The inductive unit 91 shown in FIG. 10 includes series-connected first and second inductors 911 and 921, with the second inductor 921 switchable through operation of a switch 931. Opening the switch 931 results in higher inductance of the inductive unit 91, due to the serial connection of the first and second inductors 911, 921. Closing the switch 931 results in lower inductance by shorting out the second inductor 921.

Through use of the capacitive units 70 or 71 and/or the inductive units 90 or 91, the FEM 10 has significant design flexibility. In some embodiments, the inductor 123 is replaced by either of the inductive units 90 or 91 to allow switching between resonance and matching through proper increasing and decreasing of the inductance between the antenna 11 and the tunable capacitance unit 140. The capacitors 127 and 128 and the switch 145 form a capacitive unit similar to the capacitive unit 71 of FIG. 8. The capacitive unit 70 could be used instead, with the switch 730 closed in the receive mode, and open in the transmit mode, for example. The same principle applies to the capacitors 115 and 116 and the switch 118, which could similarly be replaced with the capacitive unit 70, and use the same switching scheme described above.

Figure 11:
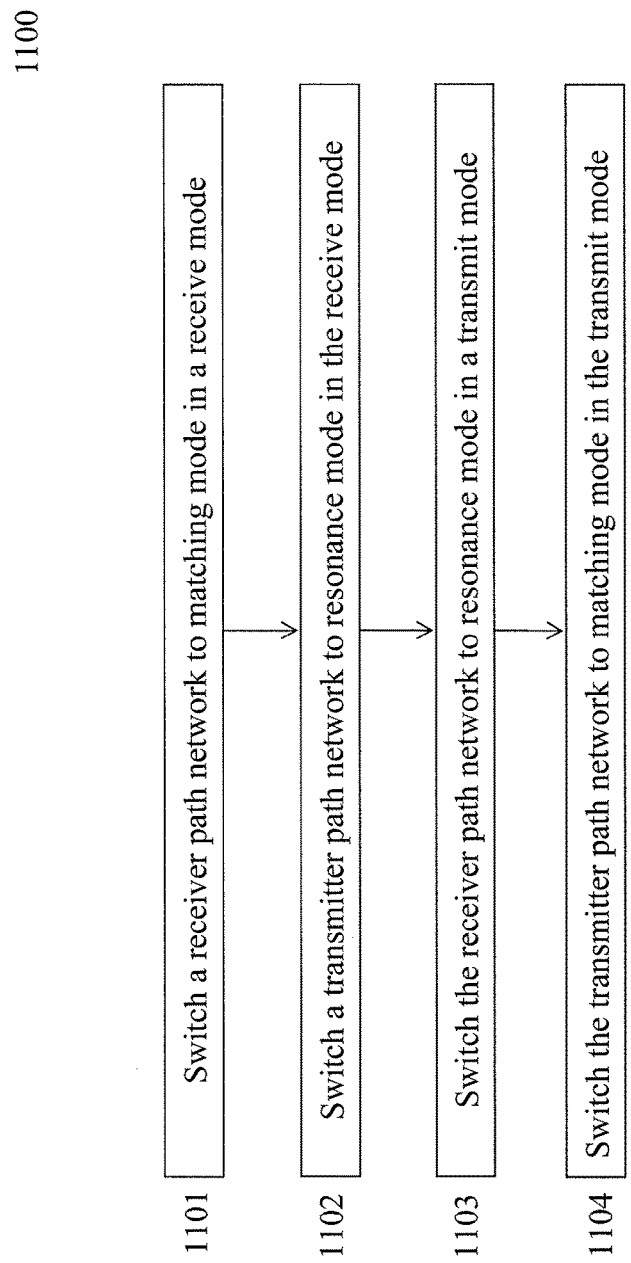
FIG. 11 is a flowchart of a method for operating a front end module in accordance with various embodiments of the present disclosure.

A method 1100 for operating a front end module, such as the FEM 10, in accordance with various embodiments of the present disclosure is shown in FIG. 11. The method 1100 is performed, for example, in the FEM 10. Description of the method 1100 is provided in terms of the FEM 10. In block 1101, the receiver path network 120 is switched to matching mode around the beginning of the receive mode. In some embodiments, the switching is accomplished by reducing capacitance of a branch of a matching network in the receiver path network 120 by introducing a series capacitor in a switchable capacitance unit, for example. In terms of FIG. 6, the switching corresponds to turning off the switch 145, which removes the direct path to ground that originally shorted out the capacitor 128, and introduces the capacitor 128 in series with the capacitor 127. The switching also includes turning off the switch 141, and turning on the switches 142-144, so as to introduce capacitance of the tunable capacitance unit 140 at the right branch of the pi network of the receiver path network 120.

In block 1102, the transmitter path network 110 is switched to resonance mode around the beginning of the receive mode. In some embodiments, switching is accomplished by reducing capacitance of a branch of a matching network in the transmitter path network 110 by introducing a series capacitor in a switchable capacitance unit, for example. In terms of FIG. 6, the switching corresponds to turning off the switch 118, which removes the direct path to ground that originally shorted out the capacitor 116, and introduces the capacitor 116 in series with the capacitor 115. The switching also includes turning off the switch 117 to open circuit the path from the node 111 to the supply voltage VDD through the inductor 113. The switching further includes turning on the MOSFETs 131 and 132 to set up a path to ground from the node 111 through the inductor 114.

In block 1103, the transmitter path network 110 is switched to matching mode around the beginning of the transmit mode. In some embodiments, the switching is accomplished by increasing capacitance of the branch of the matching network in the transmitter path network 110 by removing the series capacitor in the switchable capacitance unit, for example. In terms of FIG. 5, the switching corresponds to turning on the switch 118, which creates the direct path to ground that shorts out the capacitor 116, and leaves the capacitor 115 to determine capacitance of the capacitive unit formed by the capacitors 115-116 and the switch 118. The switching also includes turning on the switch 117 to set up the path from the node 111 to the supply voltage VDD through the inductor 113. The switching further includes biasing the MOSFET 131 to operate as part of the power amplifier formed of the MOSFETs 131, 132.

In block 1104, the receiver path network 120 is switched to resonance mode around the beginning of the transmit mode. In some embodiments, the switching is accomplished by increasing capacitance of the branch of the matching network in the receiver path network 120 by removing the series capacitor in the switchable capacitance unit, for example. In terms of FIG. 5, the switching corresponds to turning on the switch 145, which sets up the direct path to ground that shorts out the capacitor 128, and leaves the capacitor 127 to determine capacitance of the capacitive unit formed by the capacitors 127-128 and the switch 145. The switching also includes turning on the switch 141, and turning off the switches 142-144, so as to short out the capacitance of the tunable capacitance unit 140 at the right branch of the pi network of the receiver path network 120.

In some embodiments, the blocks 1101-1104 of the method 1100 shown in FIG. 11 are performed in a different order than shown. For example, the blocks 1101 and 1102 are performed simultaneously, and the blocks 1103 and 1104 are performed simultaneously. Transmit mode may precede receive mode in some embodiments. In some embodiments, the blocks 1101-1104 are repeated as long as the FEM 10 is operating, and standby modes may be introduced in between transmit and receive modes. In some embodiments, the standby mode(s) include operation such as that shown in FIG. 4, where all of the switches 117, 118, and 141-144 and the MOSFETs 131 and 132 are turned off.

The FEM 10 has many advantages. By arranging RF switches at low voltage nodes, breakdown requirements on the RF switches are relaxed. As a result, the MOSFETs 131 and 132 are used as the RF switches in the FEM, which eliminates the need for high breakdown voltage discrete components as the RF switches. The MOSFETs 131 and 132 also have a reuse property, in that they are used as a power amplifier in transmitter mode, and as the RF switches in the receive mode. Thus, the FEM 10 uses fewer switches than other FEM architectures, which saves area on the wafer-level package 40. Combining the use of PPI inductors for the inductors 113, 114, and 123 with on-chip capacitors for the capacitors 115-116, and 124-128 and the MOSFETs 131 and 132 for the RF switches allows the FEM and wireless chip to be integrated into a wafer level package having small size. This minimizes overall package size. The PPI inductors also have high Q factor, which minimizes RF power insertion loss.

In accordance with various embodiments of the present disclosure, a front end module comprises an antenna, a receiver, a transmitter, a transmitter path network coupled to the antenna and the transmitter, and comprising a first selectable matching network, and a receiver path network coupled to the antenna and the receiver, and comprising a second selectable matching network.

In accordance with various embodiments of the present disclosure, a transceiver comprises an antenna and a wafer level package. The wafer level package comprises an integrated circuit die. The integrated circuit die comprises a transmitter, a receiver, a die-side part of a transmitter path network electrically connected to the transmitter, and a die-side part of a receiver path network electrically connected to the receiver. The wafer level package further comprises a package-side part of the transmitter path network electrically connected to the die-side part of the transmitter path network and the antenna, and a package-side part of the receiver path network electrically connected to the die-side part of the receiver path network and the antenna.

In accordance with various embodiments of the present disclosure, a method comprises switching a receiver path network of a front end module to a first matching mode in a receiving cycle, switching a transmitter path network of the front end module to a first resonance mode in the receiving cycle, switching the transmitter path network to a second matching mode in a transmitting cycle, and switching the receiver path network to a second resonance mode in the transmitting cycle.

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A transceiver comprising:
an antenna; and
a first package comprising:
an integrated circuit die comprising:
a die-side part of a transmitter path network, the die-side part of the transmitter path network including first and second portions, wherein the first portion of the die-side part of the transmitter path network comprises a power amplifier comprising a plurality of metal-oxide-semiconductor field effect transistors (MOSFETs);
a die-side part of a receiver path network;
a transmitter electrically connected to the first portion of the die-side part of the transmitter path network, wherein the transmitter is connected to a gate of a MOSFET of the plurality of MOSFETs; and
a receiver connected to the die-side part of the receiver path network;
the second portion of the die-side part of the transmitter path network including a selectable capacitance unit; and
a package-side part of the transmitter path network electrically connected to the die-side part of the transmitter path network and the antenna, the package-side part of the transmitter path network is directly connected to the first portion of the die-side part of the transmitter path network; and
a package-side part of the receiver path network electrically connected to the die-side part of the receiver path network and the antenna;
at least one of the package-side part of the transmitter path network or the package-side part of the receiver path network including an inductor.

2. The transceiver of claim 1, wherein the at least one of the package-side part of the transmitter path network or the package-side part of the receiver path network which includes an inductor is the package-side part of the transmitter path network, and the inductor is a first inductor electrically connected to the power amplifier.

3. The transceiver of claim 2, wherein the first inductor is a post-passivation interconnect (PPI) inductor.

4. The transceiver of claim 2, wherein:
the package-side part of the transmitter path network further comprises a second inductor; and
the die-side part of the transmitter path network further includes a third portion; and
the third portion of the die-side part of the transmitter path network further includes:
 a switch configured to electrically connect the second inductor to an internal voltage node of the integrated circuit die.

5. The transceiver of claim 1, wherein the at least one of the package-side part of the transmitter path network or the package-side part of the receiver path network which includes an inductor is the package-side part of the receiver path network, the inductor having a first end electrically connected to the antenna, and a second end electrically connected to the die-side part of the receiver path network.

6. The transceiver of claim 1, wherein the die-side part of the receiver path network includes:
a selectable capacitance unit.

7. The transceiver of claim 5, wherein the die-side part of the receiver path network includes:
a selectable capacitance unit connected to the second end of the inductor.

8. The transceiver of claim 7, wherein the selectable capacitance unit of the die-side part of the receiver path network is configured as a capacitance divider circuit which includes:
a first capacitor of capacitance, C, a first end of the first capacitor being connected to the second end of the inductor;
a first switch connected between a second end of the first capacitor and ground;
a second capacitor of capacitance, 2C, a first end of the second capacitor being connected to the second end of the inductor;
a second switch connected between a second end of the second capacitor and ground;
a third capacitor of capacitance, 4C, a first end of the third capacitor being connected to the second end of the inductor;
a third switch connected between a second end of the third capacitor and ground; and
a fourth switch connected between the second end of the inductor and ground.

9. The transceiver of claim 6, wherein the selectable capacitance unit of the die-side part of the receiver path network is configured as a capacitance divider circuit which includes:
a first capacitor, a first terminal of the first capacitor being connected to a first node of the receiver path network, the first node also being connected to the antenna, and a second terminal of the first capacitor being connected to a second node;
a second capacitor, a first terminal of the second capacitor being connected to the second node, and a second terminal of the second capacitor being connected to ground; and
a switch connected in parallel with the second capacitor such that a capacitance of the selectable capacitance unit of the die-side part of the receiver path network is dependent upon a state of the switch.

10. The transceiver of claim 1, wherein the selectable capacitance unit of the second portion of the die-side part of the transmitter path network is configured as a capacitance divider circuit which includes:
a first capacitor, a first terminal of the first capacitor being connected to a first node of the transmitter path network, the first node also being connected to the antenna, and a second terminal of the first capacitor being connected to a second node;
a second capacitor, a first terminal of the second capacitor being connected to the second node, and a second terminal of the second capacitor being connected to ground; and
a switch, a first terminal of the switch being connected to the second node, and a second terminal of the switch being connected to ground such that a capacitance of the selectable capacitance unit of the die-side part of the transmitter path network is dependent upon a state of the switch.

11. A transceiver comprising:
an antenna; and
a first package comprising:
an integrated circuit die comprising:
 a die-side part of a transmitter path network;
 a die-side part of a receiver path network, the die-side part of the receiver path network including first and second portions;
 a transmitter electrically connected to the die-side part of the transmitter path network; and
 a receiver electrically connected to the first portion of the die-side part of the receiver path network;
 the second portion of the die-side part of the receiver path network including a first selectable capacitance unit, the first selectable capacitance unit having a first end directly connected to a first node of the receiver path network, the first node being directly connected to the antenna, wherein the first electric capacitance unit comprises a plurality of capacitors, a capacitor of the plurality of capacitors has a terminal connected to ground; and
a package-side part of the transmitter path network electrically connected to the die-side part of the transmitter path network and the antenna; and
a package-side part of the receiver path network electrically connected to the die-side part of the receiver path network and the antenna;
at least one of the package-side part of the transmitter path network or the package-side part of the receiver path network including an inductor.

12. The transceiver of claim 11, wherein the at least one of the package-side part of the transmitter path network or the package-side part of the receiver path network which includes an inductor is the package-side part of the transmitter path network and the inductor is a first inductor electrically connected to a power amplifier.

13. The transceiver of claim 12, wherein:
the package-side part of the transmitter path network further comprises a second inductor; and
the die-side part of the transmitter path network further includes:
 a switch configured to electrically connect the second inductor to an internal voltage node of the integrated circuit die.

14. The transceiver of claim 11, wherein the at least one of the package-side part of the transmitter path network or the package-side part of the receiver path network which includes an inductor is the package-side part of the receiver path network, the inductor having a first end electrically connected to the antenna, and a second end electrically connected to the first portion of the die-side part of the receiver path network.

15. The transceiver of claim 14, wherein the first portion of the die-side part of the receiver path network includes:
a second selectable capacitance unit connected to the second end of the inductor.

16. The transceiver of claim 15, wherein the second selectable capacitance unit of the first portion of the die-side part of the receiver path network is configured as a capacitance divider circuit which includes:
a first capacitor of capacitance, C, a first end of the first capacitor being connected to the second end of the inductor;
a first switch connected between a second end of the first capacitor and ground;
a second capacitor of capacitance, 2C, a first end of the second capacitor being connected to the second end of the inductor;
a second switch connected between a second end of the second capacitor and ground;
a third capacitor of capacitance, 4C, a first end of the third capacitor being connected to the second end of the inductor;
a third switch connected between a second end of the third capacitor and ground; and
a fourth switch connected between the second end of the inductor and ground.

17. The transceiver of claim 11, wherein the first portion of the die-side part of the transmitter path network includes:
a second selectable capacitance unit.

18. The transceiver of claim 17, wherein the second selectable capacitance unit of the first portion of the die-side part of the transmitter path network is configured as a capacitance divider circuit which includes:
a first capacitor, a first terminal of the first capacitor being connected to a first node of the transmitter path network, the first node also being connected to the antenna, and a second terminal of the first capacitor being connected to a second node;
a second capacitor, a first terminal of the second capacitor being connected to the second node, and a second terminal of the second capacitor being connected to ground; and
a switch connected in parallel with the second capacitor such that a capacitance of the selectable capacitance unit of the first portion of the die-side part of the transmitter path network is dependent upon a state of the switch.

19. The transceiver of claim 11, wherein the first selectable capacitance unit of the second portion of the die-side part of the receiver path network is configured as a capacitance divider circuit which includes:
a first capacitor, a first terminal of the first capacitor being connected to the first node of the receiver path network, and a second terminal of the first capacitor being connected to a second node;
a second capacitor, a first terminal of the second capacitor being connected to the second node, and a second terminal of the second capacitor being connected to ground; and
a switch, a first terminal of the switch being connected to the second node, and a second terminal of the switch being connected to ground such that a capacitance of the selectable capacitance unit of the second portion of the die-side part of the receiver path network is dependent upon a state of the switch,
wherein the plurality of capacitors comprises the first capacitor and the second capacitor, and the second capacitor is the capacitor of the plurality of capacitors having the terminal connected to ground.

20. A transceiver comprising:
an antenna; and
a first package comprising:
a package-side part of a transmitter path network electrically connected to the antenna at a node, and electrically connected between the node and a die-side part of the transmitter path network;
a package-side part of a receiver path network electrically connected between the node and a die-side part of the receiver path network; and
an integrated circuit die comprising:
a transmitter connected to the die-side part of the transmitter path network;
a receiver connected to the die-side part of the receiver path network;
a first portion of the die-side part of the transmitter path network electrically connected between the node and the transmitter;
a second portion of the die-side part of the transmitter path network including a selectable capacitance unit electrically connected between the node and ground, the selectable capacitance unit of the second portion of the transmitter path network being configured as a capacitance divider circuit;
a third portion of the die-side part of the transmitter path network including a switch electrically connected between the node and an internal voltage node of the integrated circuit die; and
a first portion of the die-side part of the receiver path network electrically connected between the node and the receiver; and
a second portion of the die-side part of the receiver path network including a selectable capacitance unit electrically connected between the node and ground, the selectable capacitance unit of the second portion of the receiver path network being configured as a capacitance divider circuit;
at least one of the package-side part of the transmitter path network or the package-side part of the receiver path network including an inductor.

* * * * *